UNITED STATES PATENT OFFICE 2,498,435

PRODUCTION OF 1,3 DIMETHYL-4-PHENYL-4-HYDROXY-PIPERIDINE

John Lee, Essex Fells, and Leo Berger, Nutley, N. J., assignors to Hoffmann-La Roche Inc., Nutley, N. J., a corporation of New Jersey No Drawing. Application July 8, 1946, Serial No. 682,134

1 Claim. (Cl. 260—293)

The present invention relates to N-tertiary piperidine compounds and to a process for producing them.

1-alkyl-4-acyloxy-4-aryl-piperidines have heretofore been prepared by reacting 1-alkyl-4-piperidone with Grignard reagents as, for example, ArMgHal to form the Grignard complex which is decomposed with water to form the corresponding 1-alkyl-4-aryl-4-hydroxy piperidines which are then acylated, as described by Jensen and Lundquist (Dansk. Tidsskr. Farm., 17 173–82 [1943]) and in Danish Patent No. 60,592, published February 15, 1943.

It has now been found that these and other new 4-organically substituted-4-piperidinols and 4-organically substituted-4-acyloxy piperidines which can be represented by the following general formula:

(I) 

where R stands for an N-tertiary piperidine residue in which the N-substituent can be an alkyl, such as methyl and branched alkyl, such as isopropyl, substituted alkyl as, for example, methoxyethyl, alkaryl such as benzyl, or cycloalkyl such as cyclohexyl; R' stands for a substituent such as an alkyl, aryl, aralkyl, heterocyclyl, heterocyclyl-methyl radical and the like; and X stands for hydrogen or acyl as, for example, acetyl, propionyl, butyrl, succinoyl, benzoyl, furoyl and the like can be more advantageously prepared by reacting lithium-organic compounds, such as lithium-alkyls, lithium-aryls, lithium-heterocyclyls, and the like with N-tertiary-4-piperidones.

The reaction proceeds smoothly and with a considerable increase in yields as compared with the employment of Grignard reagents on 4-piperidones. Not only are the yields obtained larger when employing the lithium organic compounds, but by the employment of this type of lithium reagent, the preparation of new oxy-lithium piperidine compounds or complexes can be effected. The complexes can be represented by the following formula:

(II) 

where R and R' have the same significance as in Formula I.

The large increase in yields obtained when employing the lithium organic compounds in the reaction as compared with the Grignard reagent is strikingly illustrated in the case where 1-butyl-piperidone is employed as a starting material. Thus, when phenyl magnesium halide is reacted with 1-butyl-piperidone under various conditions of temperature, solvent, and concentration of reactants, a yield of 25–30 per cent of 1-butyl-4-phenyl-4-hydroxy-piperidine is obtained on decomposition of the Grignard complex. On the other hand, when lithium-phenyl is reacted with the same piperidone, and the lithium complex hydrolyzed a yield of over 90 per cent of the piperidinol is attained.

Piperidinols of Formula I where X is H are readily formed from the lithium complex obtained on reacting the piperidone with the lithium compound by decomposing the complex with water which may be made slightly acid or alkaline to facilitate the conversion. The 4-piperidinol can be readily isolated, and acylated.

A particular advantage of the new process is that instead of decomposing the 4-oxylithium piperidine complex to form the 4-piperidinol, it can be directly acylated without the intermediate hydrolysis of the complex to the piperidinol, and the 4-acyloxy piperidine compounds obtained directly. This direct method of acylating the lithium complex offers the important advantage that it eliminates several manipulations, isolation and purification of the intermediate piperidinol, thus considerably reducing the cost of preparing the compounds of the above formula.

Another advantage of the employment of the lithium organic compounds in the reaction in place of Grignard reagents is that it permits the introduction in the 4-position of the piperidine compound of substituents which were extremely difficult of access or entirely inaccessible in the form of a Grignard reagent, such as, for example, a pyridyl or picolyl radical; or which could not be brought to react with the piperidones as, for example, thienyl magnesium halides.

The lithium compounds which are employed in the reaction with the piperidones may be represented by the following formula: R'Li, wherein R' stands for a lower alkyl, aralkyl, aryl, heterocyclyl, or heterocyclomethyl radical and the like.

When these are reacted with the piperidones, the resulting lithium complexes can be represented by the above-mentioned Formula II. These compounds can be isolated from the reaction mixture. In the case of the lower N-alkyl substituents, the complexes are insoluble and can be removed, taking precautions to work under a nonreactive atmosphere, such as dried nitrogen.

The complexes may also be soluble in the reaction mixture as in the case of the N-butyl derivatives, in which case, isolation requires the addition of a suitable nonreactive liquid such as large amounts of benzene or removal of the reaction solvent under an anhydrous inert atmosphere. Since the lithium complexes of Formula II are new, these compounds are also included within the scope of our invention.

The R'Li compounds which are employed in the reaction with the piperidones are prepared by reacting lithium metal with appropriate organic halogen compounds such as methyl iodide, butyl chloride, bromobenzene, bromonaphthalene, and the like; or by reacting lithium compounds capable of transferring lithium such as butyl lithium and phenyl lithium, with appropriate organic compounds such as bromopyridine, bromoquinoline, bromocarbazol, and the like, or by reacting the same lithium compounds capable of transferring lithium with compounds having an active hydrogen as, for example, 2-picoline, 2,6-dimethyl pyridine, carbazol, dihydroanthracene, dibenzothiophene, furan, thiophene, and the like.

It has been found that the property of reacting with 4-piperidones is not exhibited by other alkali metal derivatives of organic compounds, as, for example, the sodium derivatives corresponding to the lithium derivatives described above. For example, sodium-phenyl does not react with 1-butyl-piperidone-4 to yield 1-butyl-4-phenyl-4-piperidinol.

The reaction of the lithium compounds on the piperidones may be carried out in an inert diluent or solvent such as ether, benzene, cyclohexane, dioxane, isopropyl ether or pyridine. The reagents are employed in equivalent amounts, although excess amounts of one reagent may be employed where desired. The 4-oxylithium piperidine complexes so obtained may then be hydrolyzed with water rendered slightly acid or alkaline to facilitate the decomposition and then acylated. It is preferred, however, to acylate the lithium complex directly. The reactions involved can be illustrated by the following scheme.

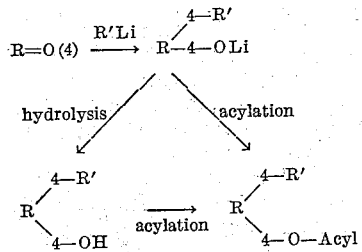

wherein R and R' have the same significance as in Formula I.

As acylating agents there can be employed either the acid anhydrides or acyl halides. As a catalyst there can be used sulfuric acid or sodium acetate and the like. It is also advantageous, particularly where an acyl halide is employed as the acylating agent, to have present an acid-binding agent, such as pyridine or potassium carbonate. The acylation may be carried out in an inert solvent as, for example, acetone or benzene. The acyloxy compounds can be converted into the form of salts, of organic and inorganic acids, for instance the tartrates, maleates, citrates, ethanesulfonates, isethionates, sulfates, hydrochlorides and the like.

The method described herein is particularly useful in the production of 1-alkyl-4-aryl-4-oxylithium piperidine complexes, 1-alkyl-4-aryl-4-hydroxy piperidines, 1-alkyl-4-aryl-4-acyloxy-piperidines and their salts.

The 4-piperidones employed as starting materials in the reaction with the organo-lithium compounds can be readily prepared by hydrolyzing and decarboxylating the 1-alkyl-3-carbalkoxy-4-piperidones.

The following examples will serve to illustrate the invention.

EXAMPLE 1

(A) *Preparation of 1-isopropyl-4-phenyl-4-hydroxy-piperidene*

In a round-bottom flask provided with stirrer, dropping funnel, condenser, and a gas inlet for keeping the system under nitrogen, 200 cc. of dry ether is placed and 4.6 grams of lithium cut into thin strips are added. 52 grams of bromobenzene in 50 cc. of dry ether are added dropwise and after the addition, the mixture is refluxed for two hours. The ether solution is then cooled to −20° C. and 35 grams of 1-isopropyl-piperidone-4 in 35 cc. of dry ether are added dropwise. After the addition, the temperature is permitted to rise to 0° C. Dilute hydrochloric acid is added dropwise until the solution is acid to Congo red. The aqueous layer is separated and basified with 20% sodium hydroxide to pH 10. The mixture is extracted with ether, the ether solution dried over potassium carbonate, and the ether distilled off. The residue is dissolved in 75 cc. of hot petroleum ether (B. P. 35–60° C.). The product, 1-isopropyl-4-phenyl-4-hydroxy piperidine, crystallizes out on cooling. M. P. 83° C. On dissolving in ether and passing dry hydrochloric acid gas through the solution, the hydrochloride separates. M. P. 231° C.

(B) *Preparation of 1-isopropyl-4-phenyl-4-propionoxy-piperidine hydrochloride*

Thirty-two grams of 1-isopropyl-4-phenyl-4-hydroxy-piperidine is dissolved in 70 cc. of pyridine, and 90 cc. of propionic anhydride is added. The solution is refluxed for three hours. The pyridine and propionic anhydride are distilled off in vacuo and the residue basified with 5% sodium hydroxide. The oil is extracted with ether, dried over potassium carbonate and the ether solution filtered. Dry hydrochloric acid gas is bubbled into the solution. The hydrochloride is filtered off, dried in a vacuum desiccator over alkali, and then crystallized from acetone-methanol. M. P. 213–4° C.

EXAMPLE 2

*Preparation of 4-phenyl-4-hydroxy-1-butyl-piperidine*

In an apparatus as described in Example 1, are placed 2.1 grams of lithium strips and 200 cc. of dry ether. 23.6 grams of bromobenzene in dry ether are added slowly and with stirring. The flask is kept under dry nitrogen throughout the reaction. A spontaneous reaction occurs and the ether is refluxed until almost all the lithium is consumed. The flask is then warmed to reflux temperature for ½ hour to complete the reaction.

The flask is cooled with Dry Ice and acetone to −20°, and 15.5 grams of 1-butyl-piperidone-4 in ether (1:3) are added slowly. The reaction mixture is then stirred for 2-3 hours at —20° C. and the 1-butyl-4-phenyl-4-oxylithium piperidine complex formed finally decomposed at 20° C. with excess ice and concentrated hydrochloric acid (1:1). An insoluble salt separates. Water is added to dissolve the salt and the ether solution is discarded after being extracted with dilute acid.

The acid solutions are combined and made basic with solid $K_2CO_3$ and finally cold 10% NaOH to pH 10. A crystalline base separates. The solid base is filtered through a sintered glass funnel and washed several times with cold water. The product is air-dried and finally dried overnight in vacuo over $CaCl_2$.

The aqueous solution of the base is extracted with ether several times and the ether solution dried and concentrated to dryness to yield a second crop of crude base. Recrystallized once from petroleum ether, 1-butyl-4-phenyl-4-hydroxy-piperidine, is obtained in pure form. It melts at 86–88° C. It is converted to the hydrochloride and recrystallization from acetone yields a colorless crystalline product which melts at 160–161° C.

On acylation with acetic anhydride, catalyzed with a drop of concentrated sulfuric acid, 1-butyl-4-phenyl-4-acetoxy-piperidine hydrochloride is obtained, M. P. 207–208° C.

On treatment with propionic anhydride, 1-butyl-4-phenyl-4-propionoxy-piperidine hydrochloride is obtained, M. P. 204–206° C.

EXAMPLE 3

*Preparation of 4-(3-pyridyl)-4-hydroxy-1-butyl-piperidine*

Thirty-nine grams of butyl chloride are reacted with lithium according to Gilman, Zoellner and Selby (J. A. C. S. 55, 1252 [1933]). The butyl lithium solution is cooled to —40° C. in an apparatus as described in Example 1, and 50 grams of 3-bromopyridine in dry ether are added dropwise. An instantaneous reaction occurs, forming a brown complex which is stirred at —40° C. for 15 minutes. 15.5 grams of 1-butyl-4-piperidone in dry ether are then slowly added at this temperature and on completion of the addition, the temperature is allowed to rise to —15° C. After stirring for 45 minutes at this temperature, the reaction mixture is decomposed by pouring in a mixture of ice and hydrochloric acid. The ethereal solution is separated, extracted with a little dilute hydrochloric acid and the acid solution returned to the reaction mixture. This is then basified with cold 10% NaOH solution to pH 10 and extracted with ether. After drying the ether extract and removal of the solvent, a viscous yellow syrup remains which distills at 156–168° C. at 0.5 mm. On distillation, the distillate crystallizes spontaneously and can be recrystallized from hexane, yielding 4-(3-pyridyl)-4-hydroxy-1-butyl-piperidine, M. P. 80–81° C.

This product yields, upon acetylating with acetic anhydride or acetyl chloride and subsequent treatment with hydrogen chloride, 4-(3-pyridyl)-4-acetoxy-1-butyl-piperidine hydrochloride melting at 215–216° C. when crystallized from ethyl acetate-methanol.

When propionic anhydride or propionyl chloride is employed as the acylating agent, 4-(3-pyridyl)-4-propionoxy-1-butyl-piperidine hydrochloride melting at 198–199° C. when crystallized from ethyl acetate-methanol, is obtained.

EXAMPLE 4

*Preparation of 4-n-butyl-4-hydroxy-1-butyl-piperidine*

In a similar manner to Example 3, butyl lithium prepared from 13.0 grams of butyl chloride and 2.0 grams of lithium are reacted with 15.5 grams of 1-butyl-piperidone-4. 14.4 grams of a thick syrup, boiling at 115–118°/1 mm. are obtained. The syrup crystallizes spontaneously on standing overnight. The base is very low melting and cannot be recrystallized.

Converted to the hydrochloride by dissolving in ether and passing dry hydrochloride acid gas through, a shiny papery product, 4-n-butyl-4-hydroxy-1-butyl piperidine hydrochloride, is obtained which when recrystallized from ethyl acetate-methanol melts at 147–148° C.

By acylating the 1-butyl-4-n-butyl-4-hydroxy piperidine hydrochloride with acetic anhydride, 1-butyl-4-n-butyl-4 - acetoxy - piperidine hydrochloride, M. P. 229–230° C., when crystallized from ethyl acetate-methanol, is obtained.

Similarly, by acylating with propionic acid anhydride, 1-butyl-4-butyl-4-propionoxy-piperidine hydrochloride, M. P. 218–219° C., when crystallized from ethyl acetate-methanol, is obtained.

EXAMPLE 5

*Preparation of 4-(2-picolyl)-4-hydroxy-1-butyl-piperidine*

Phenyl lithium prepared from 28 grams of bromobenzene and 2.5 grams of lithium are reacted with 12.4 grams of α-picoline as described by Bergmann and Rosenthal (J. prakt Chim. 135, 267 [1932]). The resultant picolyl lithium is reacted with 15.5 grams of 1-butyl piperidone-4. On working up the reaction in the manner described, a light thin syrup is obtained which boils at 148–150° C./0.9 mm. The compound is 4-(2-picolyl)-4-hydroxy-1-butyl-piperidine.

On acylation with acetic anhydride and propionic anhydride and subsequent transformation to the hydrochloride, it yields 4-(2-picolyl)-4-acetoxy-1-butyl-piperidine hydrochloride which is a hygroscopic amorphous glass, and 4-(2-picolyl)-4-propionoxy-1 - butyl - piperidine hydrochloride which is also a hygroscopic amorphous glass.

EXAMPLE 6

*Preparation of 4-(2-pyridyl)-4-hydroxy-1-butyl-piperidine*

Thirty-nine grams of butyl chloride is reacted with 6 grams of lithium as described at room temperature during a period of four hours. At this time the lithium has completely reacted and is cooled to —45° C. and 50 grams of 2-bromopyridine dissolved in ether are added rapidly. The reaction proceeds smoothly and the color changes from colorless to a deep red-violet. After stirring at —45° C. for 20 minutes, 15.5 grams of 4-butyl-piperidone-4 are added dropwise. The solution is then stirred for one hour at 15° C. and the lithium complex decomposed by pouring into ice and hydrochloric acid and working up in the manner described. In this way, a clear viscous syrup is obtained boiling at 145–147°/1 mm. This product, 4-(2-pyridyl)-4-hydroxy-1-butyl-piperidine, does not crystallize. On propionylation and transformation into the dihydrochloride, 4-(2-pyridyl)-4-propionoxy-1-butyl-piperidine dihydrochloride, melting at 170–172° C. is obtained.

EXAMPLE 7

Preparation of 4-hydroxy-4-(6'-methyl-2'-pyridyl-1-butyl-piperidine dihydrochloride Phenyl lithium is prepared from 5.0 grams of lithium and 49 grams of bromobenzene in 200 cc. of ether. To this, at 0° C., 13.4 grams of 2,6-lutidine in ether are added in 20 minutes. The purplish colored solution is cooled to −30° C. and 31 grams of 1-butyl-4-piperidone in ether is added slowly. The color changes from purple to deep Burgundy-red and becomes clear. After a further ½ hour at −20° C. it is decomposed with a mixture of equal parts of concentrated hydrochloric acid and ice. The aqueous solution is separated and alkalinized, and extracted with ether. The ether solution is dried over anhydrous potassium carbonate for 24 hours, filtered, and the solvent removed. The residue, fractionated at 1 mm., yields a product of the above-mentioned structure, boiling at 141–142° C.

The hydrochloric acid salt is a light yellow, hygroscopic, amorphous dihydrochloride containing 4 M. of water of crystallization.

On acylation with propionic anhydride and a trace of $H_2SO_4$ and with subsequent formation of the hydrochloride, 4-propionoxy-4-(6'-methyl-2'-picolyl)-1-butyl-piperidine dihydrochloride is obtained as a glassy product.

Similarly on acylation with acetic anhydride and salt formation, 4-acetoxy-4-(6'-methyl-2'-picolyl)-1-butyl-piperidine dihydrochloride is obtained as a glass.

EXAMPLE 8

Preparation of 4-(2-furyl)-4-hydroxy-1-butyl-piperidine

Five grams of lithium and 52.5 grams of bromobenzene are reacted to form phenyl lithium in 250 cc. of ether. 17.0 grams of freshly distilled furan in 20 cc. of ether are added dropwise at room temperature and the mixture refluxed for three hours. The mixture is then cooled to −10° C. and 15.5 grams of 1-butyl-piperidone-4 are added slowly. It is stirred at −15° C. for one hour and then decomposed with hydrochloric acid and ice mixture. On working up in the manner described, a product of the above structure, boiling at 215–218° C. at 0.8 to 1.0 mm., is obtained. This is converted to the hydrochloride by dissolving in dry ether and passing through hydrochloric acid gas. The product is an amorphous glass.

When acylated with propionic anhydride in the presence of a drop of sulfuric acid, a propionate is obtained which on conversion to the hydrochloride forms an amorphous glassy product, 4-(2-furyl)-4-propionoxy-1-butyl-piperidine hydrochloride.

EXAMPLE 9

Preparation of 4-methyl-4-hydroxy-1-butyl-piperidine 28.0 grams of freshly distilled methyl iodide and 2.8 grams of freshly cut lithium metal are reacted in 200 cc. of ether. The reaction is complete in two hours. The mixture is then cooled to −15° C. and 15.5 grams of 1-butyl-piperidone-4 in ether are added dropwise. After stirring for one hour at this temperature, the mixture is decomposed with ice and hydrochloric acid and worked up in the manner described. The product obtained, fractionated at 1.0 mm., yields an oil boiling at 75–76° C. $n_D^{26}=1.4686$. The product is the desired 4-methyl-4-hydroxy-1-butyl-piperidine.

On propionylation and subsequent formation of the hydrochloride, 4-methyl-4-propionoxy-1-butyl-piperidine hydrochloride is obtained, melting at 226–227.5° C., when crystallized from ethyl acetate-methanol mixture.

EXAMPLE 10

Preparation of 4-hexyl-4-hydroxy-1-butyl-piperidine

Thirty grams of n-hexyl chloride in 200 cc. of ether and 2.8 grams of lithium are reacted in the usual manner for 4½ hours. At this time a small amount of lithium which remains is removed and the mixture cooled to −10° C. 15.5 grams of 1-butyl-piperidone-4 in ether is then added dropwise and the mixture stirred at this temperature for one hour. The reaction product is then decomposed with ice and hydrochloric acid and worked up in the manner described, when a product of the above-mentioned structure boiling at 134–135° C./1–2 mm., is obtained. This material crystallizes spontaneously. On acylation with propionic anhydride in the presence of a trace of sulfuric acid, a product is obtained which on solution in ether and precipitation with hydrochloric acid yields 4-hexyl-4-propionoxy-1-butyl-piperidine hydrochloride which on crystallization from ethyl acetate melts at 210–211° C.

EXAMPLE 11

Preparation of 4-(2-thienyl)-4-hydroxy-1-butyl-piperidine 52.5 grams of bromobenzene and 5 grams of lithium are reacted in 250 cc. of ether and at the end of three hours, 21.0 grams of thiophene mixed with 25 cc. of ether are added dropwise. The mixture is refluxed for 2½ hours and then cooled to −20° C. and 15.5 grams of 1-butyl-piperidone-4 in ether are added during ½ hour. The temperature is allowed to rise to room temperature and kept there for 20 hours. It is then decomposed with hydrochloric acid and ice and worked up in the manner described. The residue crystallizes and on recrystallization from hexane, yields the above-mentioned product, melting at 82–83° C. When transformed to the hydrochloride, the compound yields a monohydrochloride, M. P. 168–169° C.

The free base when reacted with propionic anhydride and then transformed to the hydrochloride yields a colorless crystalline product, 4-(2-thienyl)-4-propionoxy-1-butyl-piperidine hydrochloride, melting at 151–153° C.

EXAMPLE 12

Preparation of 1,3-dimethyl-4-phenyl-4-hydroxy-piperidine

Phenyl lithium is formed by reacting 1.4 grams of lithium and 16.0 grams of bromobenzene in 100 cc. of ether. The solution is cooled to −20° C., and to this a solution of 12.7 grams of 1,3-dimethyl-4-piperidone in ether is added dropwise with stirring. After the addition, the stirring is continued for a further two hours at −20° C. and the reaction mixture is then decomposed with ice and hydrochloric acid mixture. The acidified layer is separated, basified and extracted with ether. After drying the ether solution and removal of the solvent, the residue on distillation in vacuum distills chiefly at 155° C./10 mm., yielding a product of the above-mentioned structure which on crystallization from n-hexane melts at 102° C.

On treatment with propionic anhydride catalyzed with a trace of sulfuric acid, a product is obtained which on salt formation with hydrochloric acid yields 1,3-dimethyl-4-propionoxy-4-phenyl-piperidine hydrochloride, M. P. 209° C. after crystallization from acetone.

EXAMPLE 13

*Preparation of 1-methyl-3,5-diethyl-4-phenyl-4-hydroxy-piperidine*

1.26 grams of lithium are reacted with 14.1 grams of bromobenzene and 100 cc. of ether at room temperature. The mixture is then cooled to −20° C. and 10 grams of 1-methyl-3,5-diethyl-4-piperidone in ether are added dropwise during ½ hour. After stirring for two hours at this temperature, the mixture is decomposed with hydrochloric acid and ice and worked up in the manner described. This yields 7 grams of a product of the above-mentioned structure which crystallized from normal hexane, M. P. 137–140° C.

5 grams of the compound are refluxed with 5 cc. of propionyl chloride on a steam bath for three hours. The excess propionyl chloride is removed in vacuum, water added, and the mixture basified with sodium hydroxide solution. The propionylated base is extracted with ether and transformed to the hydrochloride which on recrystallization from acetone melts at 216° C. The product obtained is 1-methyl-3,5-diethyl-4-phenyl-4-propionoxy-piperidine hydrochloride.

In the above examples the 4-oxylithium piperidine complexes formed by the reaction of the organo-lithium compounds on the piperidones are decomposed to the corresponding piperidinol which is subsequently acylated. The following examples will serve to illustrate the process wherein the lithium piperidine complex is directly acylated without the intermediate hydrolysis to the piperidinol and subsequent acylation.

EXAMPLE 14

*Preparation of 1-isopropyl-4-phenyl-4-acetoxy-piperidine hydrochloride*

In a 3-neck reaction flask equipped with a stirrer, reflux condenser and dropping funnel and provided with suitable arrangements for operating under an inert atmosphere 8.4 grams of lithium wire are suspended in 250 cc. of ether and reacted with 100 grams of bromobenzene. The reaction starts spontaneously and is complete in 2–3 hours. The contents of the flask are cooled with ice water and 52 grams 1-isoproyl-4-piperidone in 100 cc. of dried benzol are added. The mixture is refluxed for 1½ hours and the ether removed by allowing the temperature to rise to 55–56°. An additional 100 cc. of benzol is then added. The reaction is then cooled to 0° C. and 100 cc. of acetic anhydride in 200 cc. dried benzol is added. A yellowish-green precipitate forms, forming a thick mixture which after dilution of a further liter of benzene is refluxed for 30 minutes and allowed to stand overnight. The mixture is then cooled to 0° C. and decomposed with 100 cc. of water and finally 100 cc. of hydrochloric acid mixed with 100 grams of ice are added. The insoluble hydrochloride which separates is redissolved by the addition of 4 liters of water and the mixture is extracted with ether, the ether layer is discarded, the aqueous solution is basified to pH 10 with sodium hydroxide solution and extracted with ether. The ether solution is dried with sodium sulfate, the ether removed and the residue fractionated when 52.5 grams of a product boiling at 149–151° C./3–4 mm. are obtained. The 1-isopropyl-4-phenyl-4-acetoxy piperidine crystallizes from low boiling benzene (30–60°) and melts at 75–76°. It yields a hydrochloride which on crystallization from acetone-methanol, melts at 205–6° C.

EXAMPLE 15

*Preparation of 1-isopropyl-4-phenyl-4-propionoxy-piperidine*

In a manner similar to Example 14, lithium complex is formed from the same amounts of phenyl lithium and 1-isopropyl-4-piperidone and the reaction mixture is reacted with 80 cc. of propionic anhydride in 250 cc. of benzol, the reaction mixture refluxed for 30–40 minutes and then worked up in the manner described in Example 1. On fractionation, 27.0 grams of 1-isopropyl-4-phenyl-4-propionoxy piperidine, B. P. 140–142°/1–2 mm. are obtained. When transferred to the hydrochloride, on crystallization from isopropyl alcohol, this salt melts at 208–209° C.

The above procedure as illustrated by Examples 14 and 15 involving the direct acylation of the piperidine lithium complex can be applied to the production of the 4-acyloxy compounds as described in Examples 1–13 and in general, to the broad class of piperidine lithium complexes of Formula II.

We claim:

Process of preparing 1,3-dimethyl-4-phenyl-4-hydroxy-piperidine which comprises reacting under anhydrous conditions phenyl lithium with 1,3-dimethyl-4-piperidone and hydrolyzing to produce 1,3-dimethyl-4-phenyl-4-hydroxy-piperidine.

JOHN LEE.
LEO BERGER.

REFERENCES CITED

The following references are of record in the file of this patent:

UNITED STATES PATENTS

| Number | Name | Date |
|---|---|---|
| 2,151,047 | Preisewerk | Mar. 21, 1939 |
| 2,411,664 | Miescher et al. | Nov. 26, 1946 |

FOREIGN PATENTS

| Number | Country | Date |
|---|---|---|
| 60,592 | Denmark | Feb. 1, 1943 |
| 552,065 | Great Britain | Mar. 22, 1943 |

OTHER REFERENCES

Blicke et al.: Jour. Amer. Chem. Soc., vol. 53, p. 1017 (1931).
Lehmstedt et al.: Chem. Abstr., vol. 33, p. 5403 (1939).
Erickson; Chem. Abstr., vol. 36, p. 2853 (1942).
Willemart, Chem. Abstr., vol. 37, p. 5053 (1943).
Howton; Jour. Org. Chem., vol. 10, p. 277 (1945).